(12) United States Patent
Hirano et al.

(10) Patent No.: US 8,553,368 B2
(45) Date of Patent: Oct. 8, 2013

(54) HIGH ASPECT RATIO MOTION LIMITER OF A MICROACTUATOR AND METHOD FOR FABRICATION

(75) Inventors: Toshiki Hirano, San Jose, CA (US); Haruhide Takahashi, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 1147 days.

(21) Appl. No.: 11/986,245

(22) Filed: Nov. 19, 2007

(65) Prior Publication Data

US 2009/0128950 A1 May 21, 2009

(51) Int. Cl.
*G11B 21/24* (2006.01)
*G11B 5/56* (2006.01)

(52) U.S. Cl.
USPC ...................................... 360/294.3

(58) Field of Classification Search
USPC .......... 360/294.1–294.6, 245.7; 310/40 MM, 310/311; 335/257, 277
See application file for complete search history.

(56) References Cited

U.S. PATENT DOCUMENTS

| | | | |
|---|---|---|---|
| 6,178,069 B1 * | 1/2001 | Suzuki | 360/294.5 |
| 6,195,227 B1 | 2/2001 | Fan et al. | |
| 6,396,667 B1 * | 5/2002 | Zhang et al. | 360/294.3 |
| 6,483,671 B2 * | 11/2002 | Vigna et al. | 360/294.5 |
| 6,594,119 B1 * | 7/2003 | Koshikawa et al. | 360/294.3 |
| 6,731,471 B1 | 5/2004 | Bonin | |
| 6,735,055 B1 * | 5/2004 | Crane et al. | 360/294.6 |
| 6,751,047 B2 | 6/2004 | Bonin et al. | |
| 6,831,539 B1 | 12/2004 | Hipwell, Jr. et al. | |
| 6,851,120 B2 | 2/2005 | Crane et al. | |
| 7,311,009 B2 * | 12/2007 | Kotovsky | 73/777 |
| 7,382,583 B2 * | 6/2008 | Hirano et al. | 360/294.4 |
| 2002/0018322 A1 * | 2/2002 | Crane et al. | 360/294.5 |
| 2002/0096944 A1 | 7/2002 | Crane et al. | |
| 2004/0021989 A1 * | 2/2004 | Ma | 360/294.4 |
| 2005/0018359 A1 * | 1/2005 | Hirano et al. | 360/294.6 |
| 2006/0144143 A1 * | 7/2006 | Gogoi et al. | 73/504.12 |
| 2008/0180846 A1 * | 7/2008 | Hirano | 360/234.3 |
| 2009/0251825 A1 * | 10/2009 | Honzawa et al. | 360/245.3 |

FOREIGN PATENT DOCUMENTS

| | | | |
|---|---|---|---|
| JP | 10079112 A | * | 3/1998 |
| JP | 2007228782 A | * | 9/2007 |
| WO | WO-03090212 | | 10/2003 |

OTHER PUBLICATIONS

Iizuka, et al., "Electrostatic Micro Actuators with High-Aspect-Ratio Driving Gap for Hard Disk Drive Application", *International Symposium on Micromechatronics and Human Science*, (2000), 229-236.
Piyabongkarn, et al., "Travel Range Extension of a MEMS Electrostatic Microactuator", *IEEE Transactions on Control Systems Technology*, vol. 13, No. 1, (Jan. 2005), 138-145.

* cited by examiner

*Primary Examiner* — Will J Klimowicz

(57) ABSTRACT

A high-aspect ratio motion limiter of a microactuator and a method for fabrication are disclosed. In one embodiment, at least one low-aspect ratio gap is created in a substrate of a microactuator of a hard disk drive. The low-aspect ratio gap is then utilized to facilitate the creation of a high-aspect ratio motion limiter in the substrate of the microactuator.

16 Claims, 10 Drawing Sheets

HIGH ASPECT RATIO MOTION LIMITER OF A MICROACTUATOR AND METHOD FOR FABRICATION

TECHNICAL FIELD

Embodiments of the present invention are generally related to the field of direct access data storage devices.

BACKGROUND ART

Direct access storage devices (DASD), commonly known as hard drives or hard disk drives (HDDs), have become part of every day life, and as such, expectations and demands continually increase for greater speed for manipulating data and for holding larger amounts of data.

In order to increase the data density upon each disk of the disk drives, the spacing between adjacent tracks of a given disk is reduced. However, the precision with which an actuator arm of the disk drive can position the read/write head over a given track may not be sufficient to provide a desired level of amplification of the recorded data. As a result, some hard disk drives utilize a microactuator/slider/suspension assembly to position the read/write head more precisely over a given track of a disk. A typical microactuator provides a range of motion for the slider with reference to the suspension assembly due to spring-like components provided by the microactuator.

When the microactuator/slider/suspension assembly is subjected to a shock such as if the slider assembly contacts the disk. For example, the friction due to the physical contact between the slider and the moving data disk creates a friction force which is transmitted to the microactuator. In another instance, when the microactuator is driven at its resonant frequency, its motion can be 10-30 times higher than when it is driven at other frequencies. These conditions may create excessive stress on the spring like components of the microactuator, thus causing deformation or breakage of the springs and failure of the microactuator.

SUMMARY OF THE INVENTION

A high-aspect ratio motion limiter of a microactuator and a method for fabrication are disclosed. In one embodiment, at least one low-aspect ratio gap is created in a substrate of a microactuator of a hard disk drive. The low-aspect ratio gap is then utilized to facilitate the creation of a high-aspect ratio motion limiter in the substrate of the microactuator.

BRIEF DESCRIPTION OF THE DRAWINGS

The accompanying drawings, which are incorporated in and form a part of this specification, illustrate embodiments of the presented technology and, together with the description, serve to explain the principles of the presented technology. Unless specifically noted, the drawings referred to in this description should be understood as not being drawn to scale.

DETAILED DESCRIPTION

Reference will now be made in detail to the alternative embodiments of the present technology. While some of the present technology will be described in conjunction with the alternative embodiments, it will be understood that they are not intended to limit the present technology to these embodiments. On the contrary, embodiments of the present technology are intended to cover alternatives, modifications and equivalents, which may be included within the spirit and scope of the embodiments as defined by the appended claims.

Furthermore, in the following detailed description, numerous specific details are set forth in order to provide a thorough understanding of embodiments of the present technology. However, it will be recognized by one of ordinary skill in the art that embodiments may be practiced without these specific details. In other instances, well known methods, procedures, components, and circuits have not been described in detail as not to unnecessarily obscure aspects of embodiments of the present technology.

Figure 1:
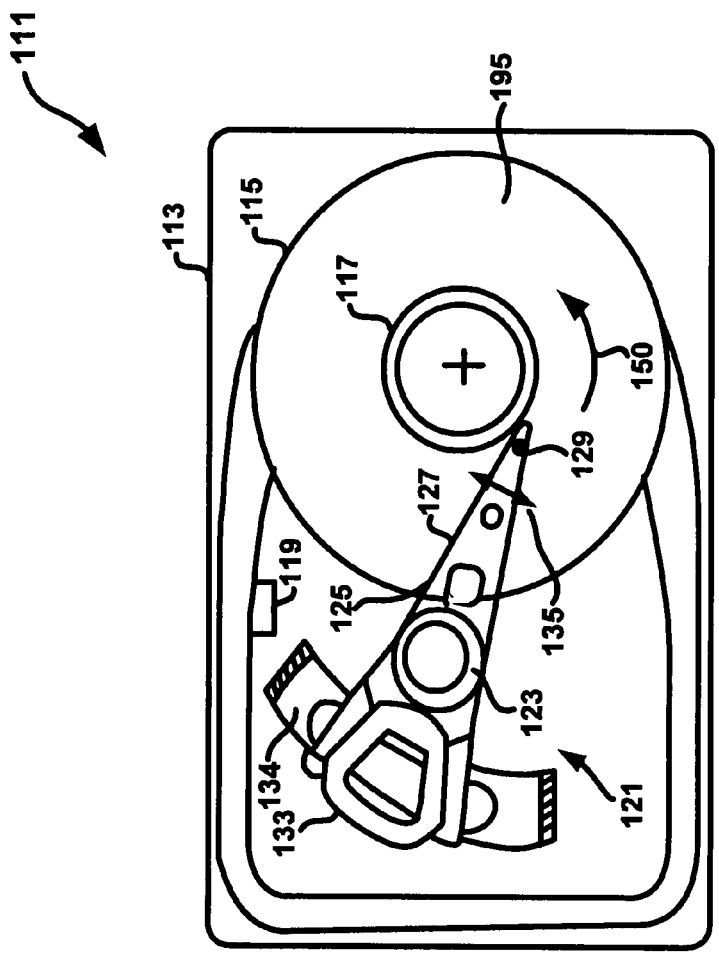
FIG. 1 is a schematic top plan view of an example hard disk drive in accordance with one embodiment of the present invention.

FIG. 1 shows a top view of one embodiment of an information storage system comprising a magnetic hard disk file or drive 111 for a computer system. Hard disk drive 111 has an outer housing or base 113 containing a disk pack having at least one media or magnetic disk 115. The disk pack (as represented by disk 115) defines an axis of rotation and a radial direction relative to the axis in which the disk pack is rotatable. A spindle motor assembly having a central shaft 117 operates as this axis and rotates disk 115, or disks of the disk pack, in the radial direction shown by arrow 150, relative to housing 113. An actuator 121 comprises a plurality of parallel actuator arms 125 (one shown) in the form of a comb that is movably or pivotally mounted to base/housing 113 about a pivot assembly 123. A controller 119 is also mounted to base 113 for selectively moving the comb of arms 125 relative to the disk pack (as represented by disk 115).

In the embodiment shown in FIG. 1, each arm 125 has extending from it at least one cantilevered integrated lead suspension (ILS) 129. The ILS 129 may be any form of lead suspension that can be used in a data access storage device, such as a hard disk drive (HDD). A slider (not shown) is usually bonded to the end of ILS 129, both of which are attached to suspension 127. Suspension 127, in one embodiment, is used as a pathway to provide an electrical connection to the slider. In one embodiment, portions of the slider are electrically isolated from ground, and in some embodiments, are also electrically isolated from suspension 127. The level of integration containing the slider, suspension, ILS, and read/write head (not shown) is called the Head Gimbal Assembly (HGA).

The ILS 129 has a spring-like quality, which biases or presses the air-bearing surface of the slider toward disk 115 to cause the slider to fly at a precise distance from disk 115. ILS 129 has a hinge area that provides for the spring-like quality, and a flexing interconnect that supports read and write traces and electrical connections through the hinge area. A voice coil 133, free to move within a conventional voice coil motor magnet assembly 134 (top pole not shown), is also mounted to actuator arms 125 opposite the head gimbal assemblies. Movement of the actuator 121 (indicated by arrows 135) by controller 119 causes the head gimbal assemblies to move along radial arcs across tracks on the surface 195 of disk 115 until the heads settle on their set target tracks. The head gimbal assemblies operate in a conventional manner and move in unison with one another, unless drive 111 uses multiple independent actuators (not shown) wherein the arms move independently of one another.

Figure 2A:
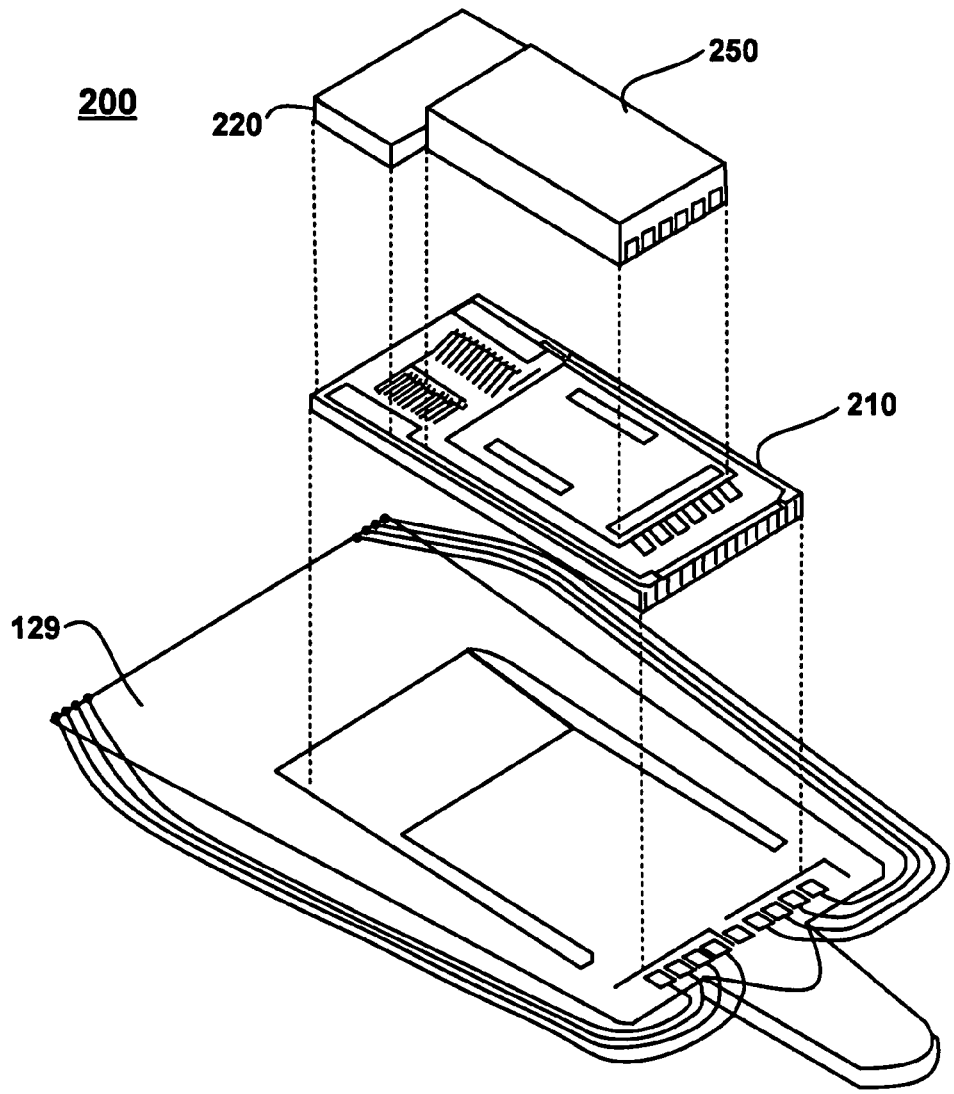
FIGS. 2A and 2B are an expanded perspective view and a perspective view respectively of a microactuator/slider/suspension assembly in accordance with an embodiment of the present invention.
Figure 2B:
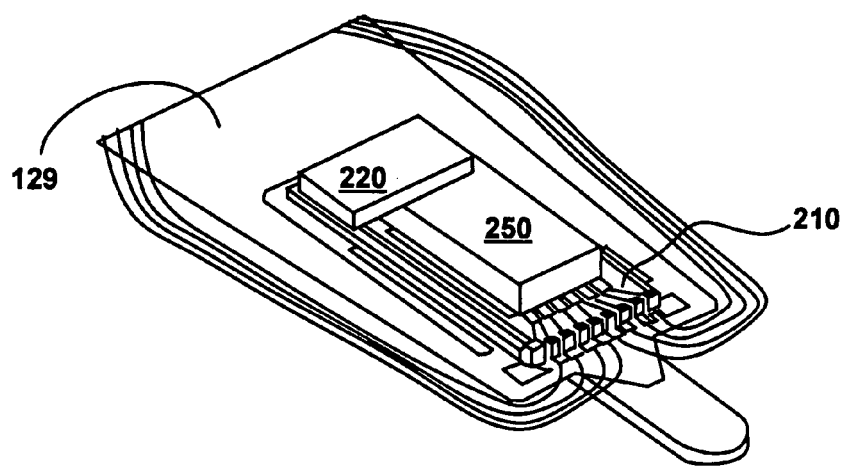

FIGS. 2A and 2B are an expanded perspective view and a perspective view respectively of a microactuator/slider/suspension assembly 200 in accordance with an embodiment of the present invention. In the embodiment of FIGS. 2A and 2B, a microactuator substrate 210 is coupled with ILS 129. A stroke generator 220 is coupled with ILS 129 as is a slider 250. In one embodiment, the head of slider 250 is of "femto" size (approximately 850×700×230 microns). FIG. 2B shows microactuator substrate 210, ILS 129 and slider 250 coupled as a microactuator/slider/suspension assembly 200 in accordance with one embodiment of the present invention. In one embodiment, microactuator substrate 210 comprises a silicon substrate which is fabricated using, for example, silicon deep-reactive-ion etching (Si-DRIE).

Figure 3:
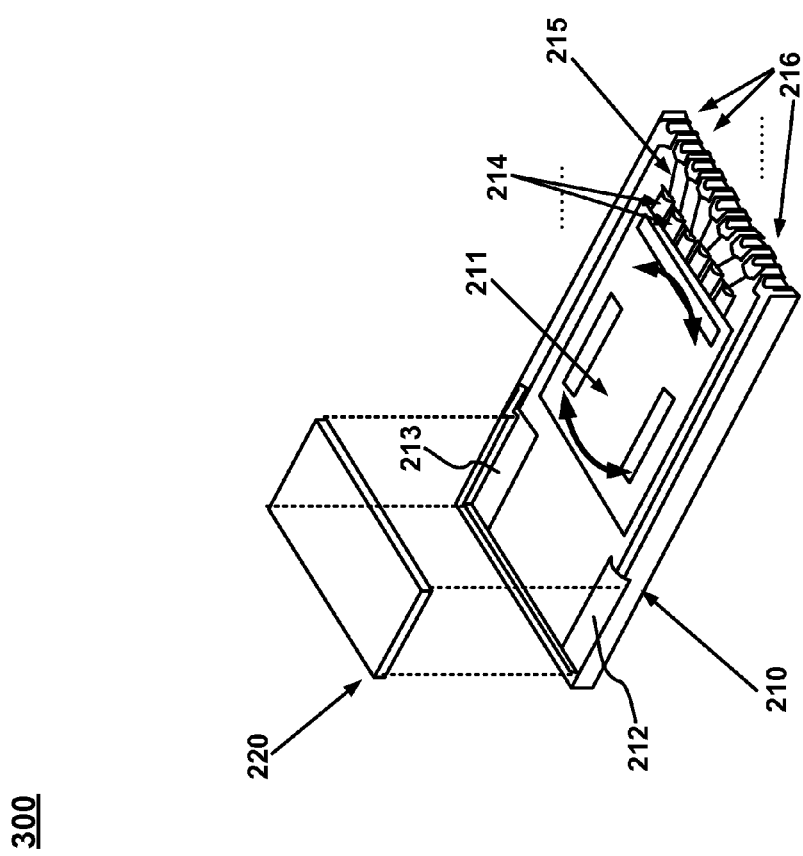
FIG. 3 is an expanded perspective view of a microactuator assembly in accordance with one embodiment of the present invention.

FIG. 3 is an expanded perspective view of a microactuator assembly 300 in accordance with one embodiment of the present invention. FIG. 3 again shows stroke generator 220 and microactuator substrate 210. In one embodiment, stroke generator 220 is coupled with region 212 and region 213 of microactuator substrate 210. In FIG. 3, microactuator substrate 210 further comprises bonding pads 214 for communicatively coupling microactuator substrate 210 with slider 250. Microactuator substrate 210 also comprises bonding pads 216 for communicatively coupling microactuator substrate 210 with ILS 129. Flexible wires 215 communicatively couple bonding pads 214 with bonding pads 216. Microactuator substrate 210 further comprises a slider bonding platform 211 which serves as a point for bonding slider 250 with microactuator substrate 210.

Figure 4:
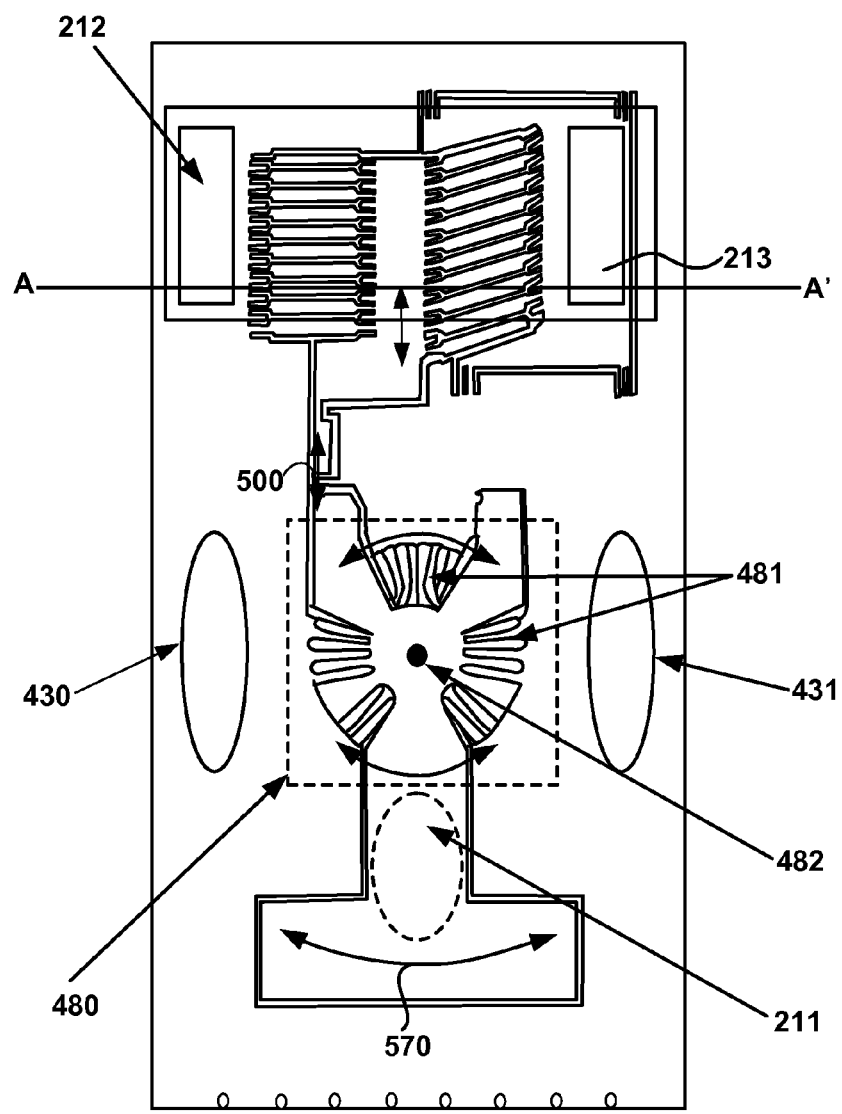
FIG. 4 is a top view of a microactuator substrate in accordance with one embodiment of the present invention.

FIG. 4 is a top view of a microactuator substrate 210 in accordance with one embodiment of the present invention. Oval regions 430 and 431 are regions disposed on the backside of microactuator substrate 210 which serve as bonding regions for coupling microactuator substrate 210 with ILS 129. FIG. 4 also shows regions 212 and 213 to which stroke generator 220 is coupled. As will be described in greater detail below, in response to movement by stroke generator 220 is translated into movement of a rotational stage 480 which is coupled with slider 250. In so doing, the amplification factor of the read/write head disposed in slider 250 can be tuned to improve performance.

Figure 5A:
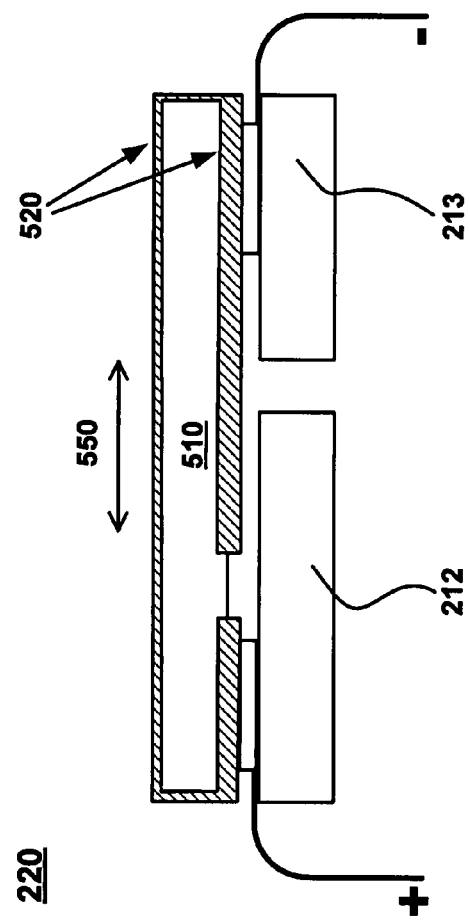
FIG. 5A is a cross section view of a stroke generator for a microactuator assembly in accordance with one embodiment of the present invention.

FIG. 5A is a cross section view of a stroke generator 220 for a microactuator assembly in accordance with one embodiment of the present invention. It is noted that FIG. 5 is shown through the section defined by A-A' shown in FIG. 4. In one embodiment, stroke generator 200 comprises a piezo-electric material which is attached to regions 212 and 213 of microactuator substrate 210 In one embodiment, stroke generator 220 comprises a lead-zirconium-titanium (PZT) oxide layer 510 which is disposed between two metallized layers 520. It is noted that other types of actuators, including multi-layer PZT actuators, may be used in embodiments of the present invention. As shown in FIG. 5, one end of stroke generator 220 is coupled with region 212 of microactuator substrate 210 while the other end is coupled with region 213 of microactuator substrate 210. In operation, when a voltage is applied to stroke generator 220, it expands/contracts lengthwise. In one embodiment, region 212 is fixed with reference to microactuator substrate while region 213 in moveable within a range of motion conventionally indicated by arrow 550.

Figure 5B:
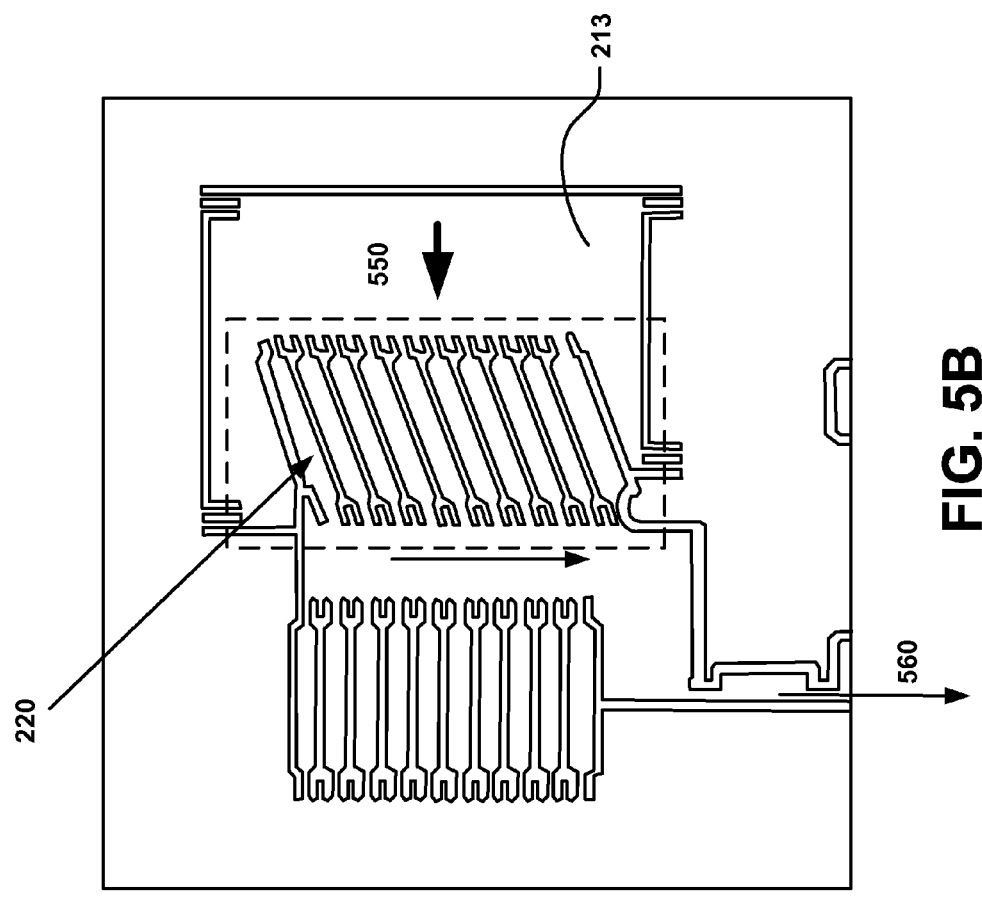
FIG. 5B is a top view of a stroke amplification mechanism in accordance with one embodiment of the present invention.

FIG. 5B is a top view of a stroke amplification mechanism 530 in accordance with embodiments of the present invention. As shown in FIG. 5B, as stroke generator 220 expands/contracts in response to an applied voltage, region 213 moves with reference to region 212 of microactuator substrate 210. As shown in FIG. 5B, the movement of region 213 (e.g., arrow 550) is the translated into an orthogonal movement conventionally indicated by arrow 560 via the stroke amplification mechanism 530.

Referring again to FIG. 4, orthogonal movement 560 transmitted to rotational stage 480 of microactuator substrate 210. Rotational stage 480 is supported by a set of rotational springs 481 about a center of rotation 482. In one embodiment of the present invention, rotational springs 481 are arranged so that only a rotational movement of rotational stage 480 is permitted in response to orthogonal movement 560. Thus, in response to a voltage applied to stroke generator 220, a movement (e.g., 550) of the stroke amplification mechanism 530 is converted into an orthogonal movement (e.g., 560) which is then conveyed to rotational stage 480. Rotational stage 480 converts the orthogonal movement (e.g., 560) to a rotational movement conventionally indicated by arrow 570. Because slider 250 is coupled with slider bonding platform 211, this in turn causes a movement of slider 250.

As described above, the motion of rotational stage 480 can become excessive when microactuator assembly 300 is driven at its resonant frequency, or when it is subjected to a large input force. If one of these conditions occurs, movement of rotational stage 480 can exceed the yield strength of the material comprising microactuator substrate 210. In other words, the force can deform, or break, rotational springs 481. Embodiments of the present invention comprise motion limiters for microactuator assembly 300 to limit the movement of the portion of slider bonding platform 211.

Figure 6:
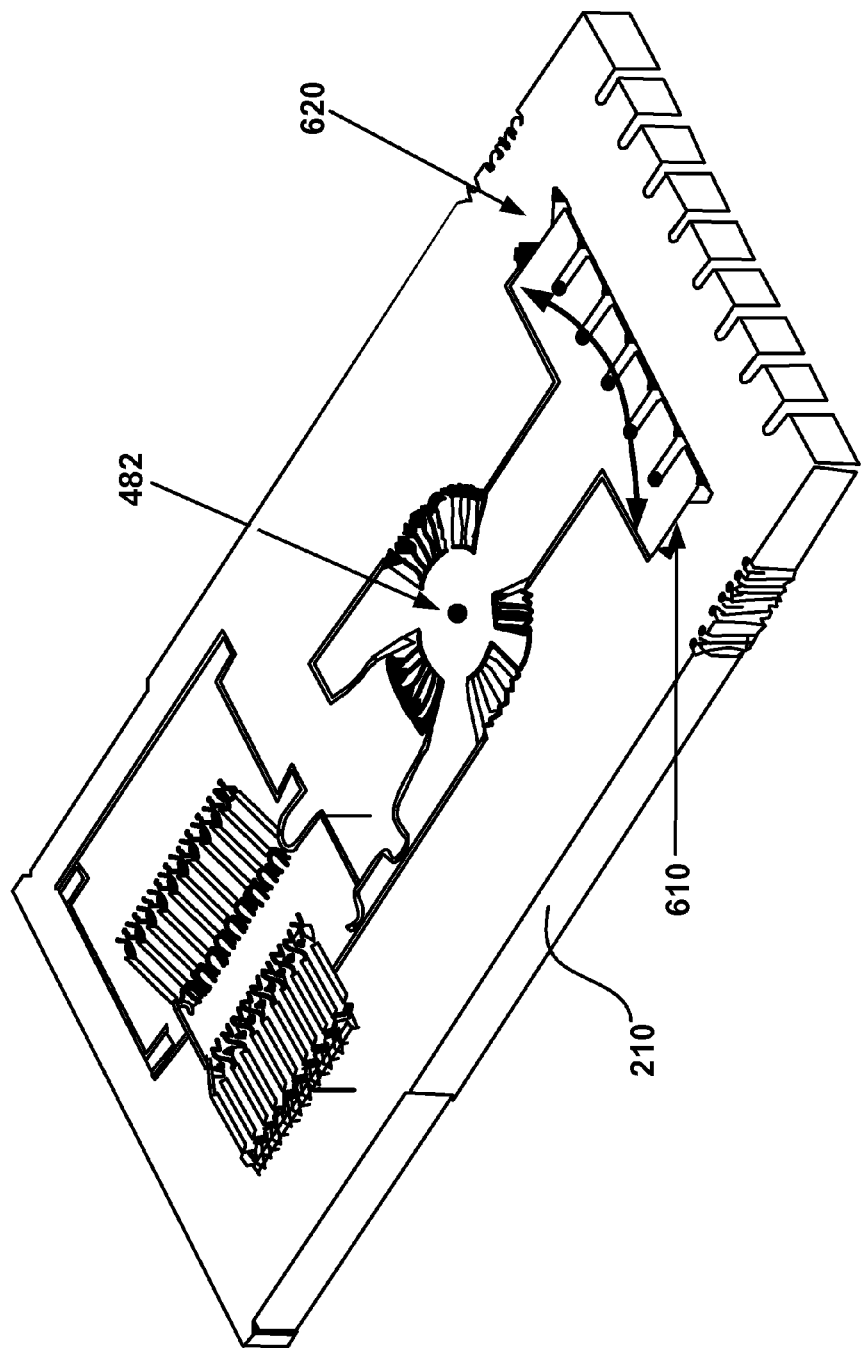
FIG. 6 is a perspective view of a microactuator substrate with high aspect ratio motion limiters in accordance with one embodiment of the present invention.

FIG. 6 is a perspective view of a microactuator substrate 210 with high aspect ratio motion limiters in accordance with one embodiment of the present invention. As shown in FIG. 6, a first motion limiter 610 and a second motion limiter 620 are fabricated within microactuator substrate 210. As shown in FIG. 6, first motion limiter 610 and second motion limiter 620 are located at the portion of slider bonding platform 211 which is located farthest from the center of rotation 482 of rotational stage 480. This is advantageous in that the force transmitted by rotational stage 480 to the motion limiters is reduced. In other words, the torque induced by rotational stage 480 conveys a smaller amount of force when a moving part of slider bonding platform 211 contacts a stationary part of microactuator substrate 210 as the distance between the center of rotation 482 to the motion limiters (e.g., 610 and 620) is increased.

Figure 7:
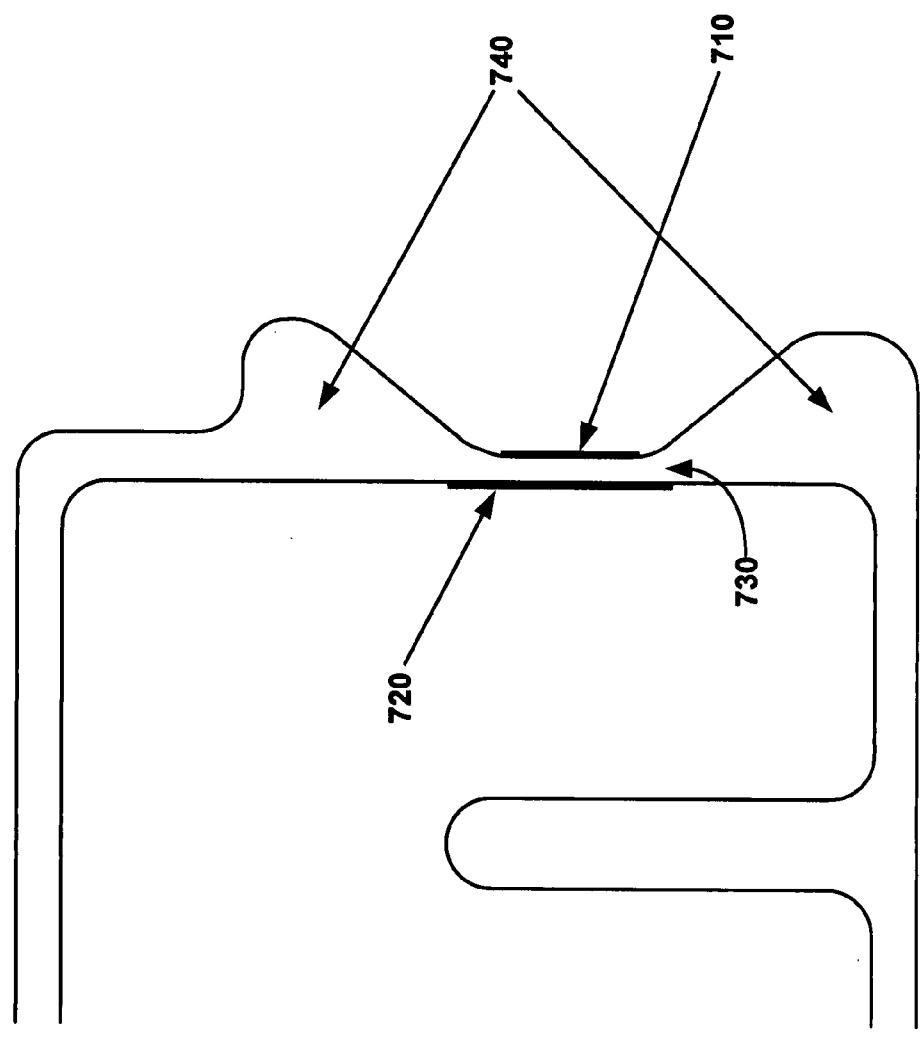
FIG. 7 is a top view of a high aspect ratio motion limiter in accordance with one embodiment of the present invention.

FIG. 7 is a top view of a high aspect ratio motion limiter 620 in accordance with one embodiment of the present invention. It is noted that FIG. 7 shows second motion limiter 620 of FIG. 6. However, the following description also describes the operation of first motion limiter 610 in accordance with an embodiment of the present invention. As shown in FIG. 7, second motion limiter 620 comprises a limiter surface 710 which comprises a stationary surface of microactuator substrate 210. Second motion limiter 620 further comprises limiter surface 720 which comprises a moving surface of slider bonding platform 211. Also shown is a high-aspect ratio gap 730 between limiter surfaces 710 and 720. In embodiments of the present invention, second motion limiter 620 further comprises low-aspect ratio gaps 740 which are located adjacent to high-aspect gap 730.

In one embodiment, limiter surface 710 and limiter surface 720 are parallel surfaces configured such that at the maximum stroke of slider bonding platform 211, limiter surfaces 710 and 720 contact perpendicularly to the direction of movement (e.g., 570 of FIG. 4) of slider bonding platform 211. Additionally, in one embodiment, the surface area of limiter surface 710 and limiter surface 720 are maximized in order to reduce the stress created on microactuator substrate 210 when these surfaces contact each other. Since stress is inversely proportional to the contact area, a larger area reduces the stress caused by contact between limiter surface 710 and limiter surface 720.

In one embodiment of the present invention, the size of high-aspect gap 730 is selected such that the maximum stroke permitted by motion limiter 620 does not exceed the yield strength of rotational springs 481. As discussed above, excessive motion of slider bonding platform 211 can rotate rotational stage 480 such that the yield strength of rotational springs 481 is exceeded. In embodiments of the present invention, the maximum desired stress to be applied to rotational springs 481 is calculated. Based upon the distance between motion limiter 620 and center of rotation 482, this maximum amount of force can then be controlled by selecting the size of high-aspect gap 730. In other words, the size of high-aspect gap 730 is controlled such that the motion of slider bonding platform 211 does not overstress rotational springs 481.

In one embodiment, it is desired to create a narrow gap 730 to reduce stress on rotational springs 481. It is also desirable to maximize the surface areas of limiter surfaces 710 and 720. Thus, utilizing high-aspect ratio gap 730 facilitates meeting both desired conditions simultaneously. As an example, in one embodiment of the present invention, high-aspect gap 730 is 5 micrometers in width while the thickness of microactuator substrate 210 is 100 micrometers. Thus, the aspect ratio of high-aspect gap 730 is 20 in one embodiment. However, embodiments of the present invention are well suited for using a high-aspect ratio gap with an aspect ratio of at least 5. As discussed above, in one embodiment microactuator substrate 210 is fabricated using Si-DRIE techniques. This technique uses highly directional etching plasma that removes material in a vertical direction, but removes little material in the horizontal direction. However, when utilized to create high aspect ratio trenches, the etching plasma is impeded from reaching the bottom of the etch structure. Additionally, removal of etch products from the bottom of the etch structure is more difficult in high aspect ratio structures. As a result, creating high-aspect ratio structures in a substrate using Si-DRIE techniques can take longer than desired.

In one embodiment of the present invention, low-aspect ratio gaps 740 facilitate the creation of a high-aspect ratio gap 730. Low-aspect ratio gaps 740 serve as etching assist structures which surround high-aspect ratio gap 730. The etching speed of low-aspect ratio gaps 740 is faster than that of high-aspect ratio gap 730. Thus, during fabrication, low-aspect ratio areas 740 go deeper than high-aspect ratio gap 730 at a given time and create large volume openings on both sides of high-aspect gap 730. These large volume openings assist both in the supply of fresh etching plasma to high-aspect gap 730 and enhance the removal of etch products from high-aspect gap 730. As a result, the etch speed of high-aspect gap 730 is accelerated in embodiments of the present invention. Furthermore, the high-aspect ratio gaps 730 are integrated into the microactuator substrate 210 in contrast to some other techniques. Thus, embodiments of the present invention reduce the number of manufacturing steps involved in creating motion limiting structures for a microactuator and reduce the cost of manufacturing.

Figure 8:
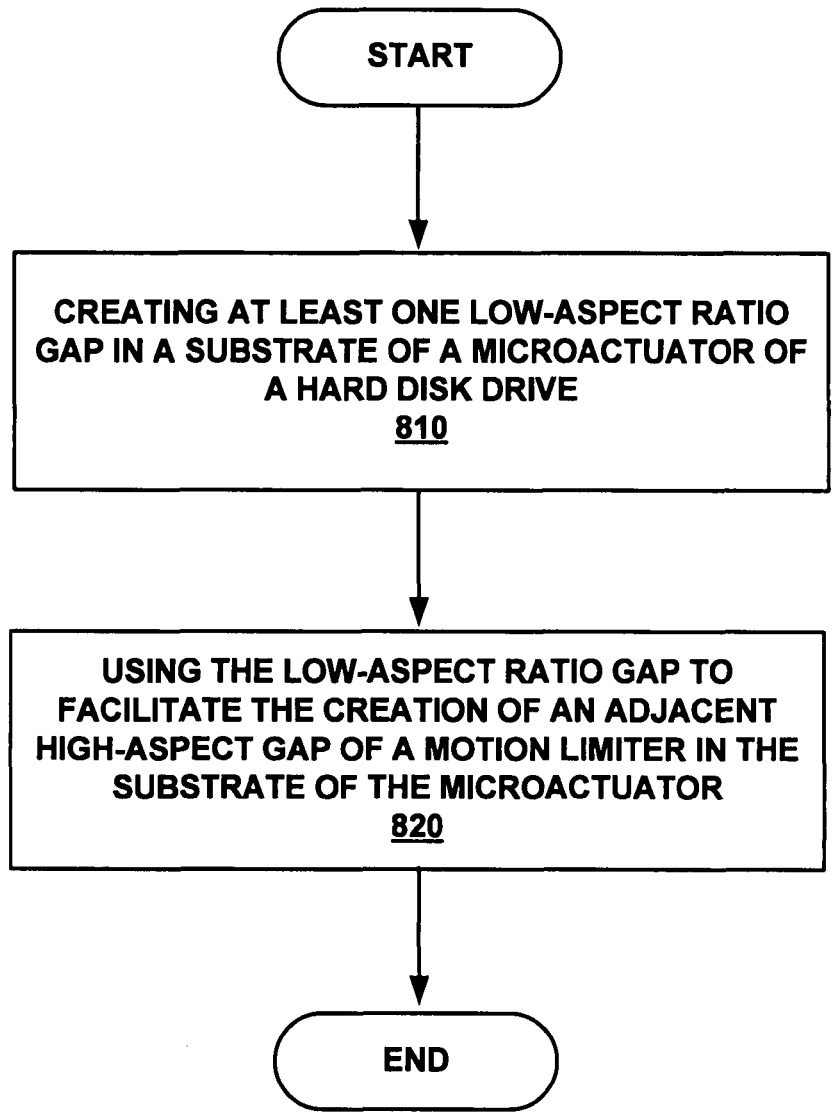
FIG. 8 is a flowchart of a method for fabricating a high aspect ratio motion limiter of a microactuator in accordance with one embodiment of the present invention.

FIG. 8 is a flowchart of a method 800 for fabricating a high aspect ratio motion limiter of a microactuator in accordance with one embodiment of the present invention. In operation 810 of FIG. 8, at least one low-aspect ratio gap is created in a substrate of a microactuator of a hard disk drive. As described above with reference to FIG. 7, low-aspect ratio gaps 740 are created in microactuator substrate 210

In operation 820 of FIG. 8, the low-aspect ratio gap is used to facilitate the creation of an adjacent high-aspect ratio gap of a motion limiter in the substrate of the microactuator. As described above, creating low-aspect ratio gaps 740 adjacent to a high-aspect ratio region (e.g., gap 730 of FIG. 7) facilitates supplying fresh etching plasma to the high-aspect ratio region and enhance the removal of etch products. As a result, fabricating a high-aspect ratio region (e.g., gap 730) can be performed faster than if low-aspect ratio gaps 740 are not created. In one embodiment, low-aspect ratio gaps 740 are created prior to creating gap 730. In another embodiment, low-aspect ratio gaps 740 are fabricated concurrent with the fabrication of gap 730.

The foregoing descriptions of example embodiments have been presented for purposes of illustration and description. They are not intended to be exhaustive or to limit the teaching to the precise forms disclosed. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A microactuator for a data storage device, said microactuator comprising:
at least one integrated high-aspect ratio motion limiting structure formed in a substrate of a first thickness consisting of two parallel flat and of a unitary composition surfaces which are separated by a high-aspect ratio gap, said high-aspect ratio gap being one twentieth of said first thickness, wherein one of said two parallel flat and of a unitary composition surfaces is longer than a second of said two parallel flat and of a unitary composition surfaces.

2. The microactuator of claim 1 wherein said microactuator further comprises:
a first high-aspect ratio motion limiting structure for limiting the range of motion implemented by said microactuator in a first direction; and
a second high-aspect ratio motion limiting structure for limiting the range of motion implemented by said microactuator in a second direction.

3. The microactuator of claim 1 wherein said at least one integrated high-aspect ratio motion limiting structure is fabricated using a silicon substrate material of said microactuator.

4. The microactuator of claim 3 wherein said at least one high-aspect ratio motion limiting structure is fabricated using a silicon deep-reactive ion etching (Si-DRIE) technique.

5. The microactuator of claim 1 wherein said microactuator utilizes a rotational stage to implement motion of a surface of said high-aspect ratio motion limiting structure.

6. The microactuator of claim 5 wherein said at least one high-aspect ratio motion limiting structure is disposed at a maximum distance from a center of rotation of said rotational stage.

7. The microactuator of claim 6 wherein a first of the two parallel flat and of a unitary composition surfaces and a second of the two parallel flat and of a unitary composition surfaces are oriented perpendicular to a direction of motion implemented by said rotational stage.

8. The microactuator of claim 1 wherein said high-aspect ratio gap comprises an aspect ratio of at least 5.

9. A data storage device comprising:
a housing;
a disk pack mounted to the housing and comprising at least one disk that is rotatable relative to the housing, the disk pack defining an axis of rotation and a radial direction relative to the axis;
a magnetic head support assembly mounted to the housing and being movable in a first direction that is perpendicular to said axis of rotation; and
a microactuator coupled with said magnetic head support assembly and said microactuator comprising at least one integrated high-aspect ratio motion limiting structure consisting of two parallel flat and of a unitary composition surfaces formed in a substrate of a first thickness which are separated by at least one high-aspect ratio gap, said high-aspect ratio gap being one twentieth of said first thickness adjacent to a low-aspect ratio region in the substrate of said microactuator, wherein one of said two parallel flat and of a unitary composition surfaces is longer than a second of said two parallel flat and of a unitary composition surfaces.

10. The data storage device of claim 9 further comprising:
a first integrated high-aspect ratio motion limiting structure comprising said at least one high-aspect ratio gap; and
a second integrated high-aspect ratio motion limiting structure comprising a second high-aspect ratio gap.

11. The data storage device of claim 9 wherein said at least one high-aspect ratio gap is fabricated within a silicon substrate material of said microactuator.

12. The data storage device of claim 11 wherein said at least one high-aspect ratio gap is fabricated using a silicon deep-reactive ion etching (Si-DRIE) technique.

13. The data storage device of claim 9 further comprising:
a rotational stage to implement motion in response to a voltage.

14. The data storage device of claim 13 wherein said at least one high-aspect ratio gap is disposed at a maximum distance from a center of rotation of said rotational stage.

15. The data storage device of claim 9 wherein a first parallel surface and a second parallel surface defining said high-aspect ratio gap are oriented perpendicular to a direction of motion implemented by a rotational stage.

16. The data storage device of claim 9 wherein said high-aspect ratio gap comprises an aspect ratio of at least 5.

* * * * *